(12) United States Patent  
Fiorone et al.

(10) Patent No.: US 9,426,062 B2  
(45) Date of Patent: Aug. 23, 2016

(54) FAULT MONITORING IN CONNECTION-ORIENTED NETWORKS

(75) Inventors: Raoul Fiorone, Genoa (IT); Riccardo Martinotti, Savona (IT); Andrea Corti, Varazze (IT)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 985 days.

(21) Appl. No.: 13/512,199

(22) PCT Filed: Jan. 15, 2010

(86) PCT No.: PCT/EP2010/050473  
§ 371 (c)(1),  
(2), (4) Date: Sep. 17, 2012

(87) PCT Pub. No.: WO2011/066997  
PCT Pub. Date: Jun. 9, 2011

(65) Prior Publication Data  
US 2013/0021918 A1  Jan. 24, 2013

(30) Foreign Application Priority Data  
Dec. 1, 2009 (EP) .................................... 09177597

(51) Int. Cl.  
*H04L 12/437* (2006.01)  
*H04L 12/723* (2013.01)  
*H04L 12/26* (2006.01)  
*H04L 12/701* (2013.01)  
(Continued)

(52) U.S. Cl.  
CPC .............. *H04L 45/50* (2013.01); *H04L 12/437* (2013.01); *H04L 43/0817* (2013.01); *H04L 45/00* (2013.01); *H04L 45/10* (2013.01); H04L 45/22 (2013.01); *H04L 45/28* (2013.01); *H04L 41/0654* (2013.01)

(58) Field of Classification Search  
CPC ........ H04L 12/42; H04L 12/437; H04L 45/00  
See application file for complete search history.

(56) References Cited

U.S. PATENT DOCUMENTS 6,456,589 B1   9/2002   Shah et al.  
6,952,396 B1*  10/2005  Cottreau et al. ............... 370/222  
(Continued)

FOREIGN PATENT DOCUMENTS

EP          1 324 568        7/2003

OTHER PUBLICATIONS

International Search Report for PCT/EP2010/050473 mailed Mar. 31, 2010.  
(Continued)

*Primary Examiner* — Raj Jain  
(74) *Attorney, Agent, or Firm* — Baker Botts, LLP (57) ABSTRACT

The invention relates to a method of fault monitoring in a fault monitoring entity of a network node of a network having at least a first connection-oriented network layer, having first protection measures associated therewith, and a second connection-oriented network layer, having second protection measures associated therewith. In a first step the service condition status of the first network layer is monitored using the first protection measures. In a second step the second network layer protection measures are determined for onward transmission within the second network layer depending on the service condition status of the first network layer. Since the network node is aware of the monitored status condition of both the first and second layers the protection mechanisms for the first network layer and the second network layer can be co-ordinated and the second network layer protection measure for onward transmission may be determined for optimum network fault protection operation.

11 Claims, 9 Drawing Sheets

(51) Int. Cl.
*H04L 12/751* (2013.01)
*H04L 12/707* (2013.01)
*H04L 12/703* (2013.01)
*H04L 12/24* (2006.01)

(56) References Cited

U.S. PATENT DOCUMENTS

| | | | |
|---|---|---|---|
| 7,336,605 B2* | 2/2008 | Bruckman et al. | 370/230 |
| 7,606,140 B2* | 10/2009 | Golla | 370/216 |
| 2001/0033570 A1* | 10/2001 | Makam et al. | 370/373 |

OTHER PUBLICATIONS

"ATM-MPLS Network Interworking Version 1.0 AF-AIC-0178.00", The ATM Forum Technical Committee, vol. AF-AIC-0178.000, Aug. 1, 2001, pp. 1-23.

ALCATEL: "ATM in the Next Generation Network", ATM-MPLS Mediation, ALCATEL Technical White Paper, Aug. 31, 2001, pp. 1-16.

EPO Communication pursuant to Article 94(3) EPC for Application No. 10 700 744.5-1862—Jun. 14, 2016.

* cited by examiner

| Byte 1 | Byte 2 | Byte 3 | Byte 4 | Byte 5 | Byte 6 |
|---|---|---|---|---|---|
| DoNotSwitch Type 462 | | Length 464 | | Value 466 | |

| Status of OTN service path | Status of OTN standby path | Status of MPLS-TP client | Action taken by Node C | Action taken by Node D | Effect on Network |
|---|---|---|---|---|---|
| UP | UP | UP | Non intrusive mode: check & send MPLS-TP CC packets to Node D | MPLS-TP layer ok: no switch | Normal operation: no faults |
| | | | Intrusive mode: check & re-send MPLS-TP OAM CC packets to Node D | MPLS-TP layer ok: no switch | |
| FAULTY | UP | N/A | Non intrusive mode: send MPLS-TP OAM "Do not Switch" message to Node D | OTN network recovering fault: No MPLS-TP layer switch | OTN layer recovers fault: MPLS-TP layer undisturbed |
| | | | Intrusive mode: create new MPLS-TP CC packets to send to Node D | MPLS-TP layer ok: No switch | |
| FAULTY | FAULTY | N/A | Non intrusive mode: no MPLS-TP CC information packets being received or sent | fault detected: initiate MPLS-TP layer switch | OTN layer cannot recover fault: MPLS layer switches |
| | | | Intrusive mode: no MPLS-TP CC information packets being received or re-sent | fault detected: initiate MPLS-TP layer switch | |
| UP | FAULTY | UP | Non intrusive mode: check & send MPLS-TP CC packets to Node D | MPLS-TP layer ok: No switch | OTN layer recovers fault: MPLS-TP layer undisturbed |
| | | | Intrusive mode: check & re-send MPLS-TP CC packets to Node D | MPLS-TP layer ok: No switch | |
| ANY | ANY | FAULTY | Non intrusive mode: no MPLS-TP CC packets sent | fault detected: initiate MPLS-TP layer switch | Fault is in MPLS-TP layer: MPLS-TP layer switches |
| | | | Intrusive mode: no MPLS-TP CC packets sent | fault detected: initiate MPLS-TP layer switch | |

Figure 11

FAULT MONITORING IN CONNECTION-ORIENTED NETWORKS

This application is the U.S. national phase of International Application No. PCT/EP2010/050473 filed 15 Jan. 2010 which designated the U.S. and claims priority to EP09177597.3 filed 1 Dec. 2009, the entire contents of each which are hereby incorporated by reference.

TECHNICAL FIELD

The invention relates to fault monitoring in connection-oriented networks, and in particular this invention relates to fault monitoring in a network with a plurality of different networks or network layers with fault monitoring and protection mechanisms.

BACKGROUND

Historically, transport networks for transporting large amounts of data have been based on Time Division Multiplexing (TDM). Increasingly, however, packet-switched networks are replacing TDM networks because of their ability to handle data traffic like ETHERNET or Internet Protocol (IP) data in a more optimised and flexible way.

In particular, connection-oriented packet-switched (CO-PS) networks have been proposed for the migration from legacy networks towards all-packet networks. CO-PS networks combine the flexible data routing and statistical behaviour of the packet switched network with guaranteed end-to-end connection performance, monitoring manageability and end-to end resilience.

In order to provide end-to end connection performance between two nodes of a network, CO-PS networks establish a working path through the network between the two end nodes via a plurality of intermediate nodes, through which data traffic (generally packets) are routed. In addition, a standby path through the network between the two end nodes is also established. The status of the working path through the network is monitored using network Operation Administration and Maintenance (OAM) tools and protection mechanisms, and if a fault with a node of the network or a fault with a link between two nodes of the network is detected, the data traffic is switched from the working path to the standby path of the network in order to maintain the connection between the end nodes.

One common network protection mechanism that enables a fault within a link or a node of the network to be detected is the use of OAM Continuity check (CC) packets. These OAM CC packets are periodically sent along the working path, and typically also along the standby path, and their receipt is monitored to determine whether the working path and the standby path are operational. If OAM CC packets are not received through the working path, the data traffic packets are switched to the established standby path. Generally, it is required that switching to the standby path after detection of a fault is accomplished quickly, typically within a period of the order of 50 ms.

Commonly the working path established between two end nodes may traverse a number of different networks. In addition to protection mechanisms associated with a network layer established between the end nodes, each network may have its own protection mechanisms associated with a network layer established for that network. In a situation where a number of network types co-exist and inter-work to provide a data traffic service, the operation of the different network layers' protection mechanisms may result in instability of the network as a whole, or may result in a delay in providing protection against faults.

SUMMARY

The present invention seeks to alleviate at least some of the problems of the prior art and to provide fault monitoring in connection-oriented networks.

According to the present invention there is provided a method of fault monitoring in a fault monitoring entity of a network node of a network having at least a first connection-oriented network layer, having first protection measures associated therewith, and a second connection-oriented network layer, having second protection measures associated therewith. In a first step the service condition status of the first network layer is monitored using first protection measures. In a second step second network layer protection measures are determined for onward transmission within the second network layer depending on the service condition status of the first network layer. Since the network node is aware of the monitored status condition of the first network layer, the protection mechanisms for the first network layer and the second network layer can be co-ordinated and the second network layer protection measure for onward transmission may be determined for optimum network fault protection operation. In embodiments of the invention the determined second network layer protection message for onward transmission within the second network layer is created. In embodiments of the invention, the service status of the working path of the second network layer is monitored using received second network layer protection measures and the second network layer protection measures are determined for onward transmission within the second network layer depending on the service status of the working path of the second network layer.

In embodiments of the invention a switch-inhibiting second network layer protection message, which inhibits switching of the working path of the second network layer, is determined for onward transmission within the second network layer if the step of monitoring the service condition status of the first network layer indicates that the first network layer has a fault recoverable by the first network layer. Thus the existing second network layer working path is maintained by inhibiting switching to the second network standby path when the fault can be recovered in the first network layer. In this way, undue instability in the network can be avoided.

In embodiments of the invention, the switch-inhibiting second network layer protection message determined for onward transmission is substantially identical to or at least substantially corresponds to a second network layer protection message received at the network node. In this mode the operation of other nodes in the network is unaltered.

In other embodiments of the invention the switch-inhibiting second network layer protection message determined for onward transmission is a DoNotSwitch type second network layer protection message. In embodiments of the invention the DoNotSwitch type second network layer protection message is a Type-Length-Value network layer protection message having a type field value identifying the DoNotSwitch-type network layer protection message type. In this mode of operation, a simple message is provided to ensure correct operation of the fault protection measures.

In embodiments of the invention the status of at least the current working path and the current stand-by path of the first network layer are monitored using first protection measures. In embodiments of the invention, protection messages of the second network layer received via the first network layer working path or the first network layer stand-by path are monitored to determine the status of the second network layer.

In accordance with a second aspect of the invention, there is provided a machine-readable medium comprising instructions which, when executed by a processor at a network node in a connection-oriented network, cause the processor to perform a method of fault monitoring in a network node of a network as set out above.

In accordance with a third aspect of the invention, there is provided a method of fault monitoring in a fault monitoring entity of a network node of a network in which a connection-oriented network layer is established having protection measures associated therewith. In a first step a working path of the connection-oriented network layer is monitored for received network layer protection measures. In a second step it is determined whether a DoNotSwitch-type protection message for inhibiting switching of the working path of the connection-oriented network layer is received. In a third step the existing network layer working path continues to be monitored in response to receipt of a DoNotSwitch-type protection message. Therefore when the second network layer message for onward transmission is a DoNotSwitch protection message, a node receiving the DoNotSwitch protection message does not perform a switch to the standby path. Thus a mechanism for the prevention of switching of the second network layer is provided.

Embodiments of the invention also comprise the step of determining whether a continuity protection message is received, and the step of initiating a switch to a network layer stand-by path in response to a failure to receive a continuity protection message or a DoNotSwitch-type protection message.

In accordance with embodiments of the invention the DoNotSwitch type protection message is a Type-Length-Value network layer protection message having a type field value identifying the DoNotSwitch-type network layer protection message type. This enables the invention to be implemented easily.

In accordance with a fourth aspect of the invention, there is provided a machine-readable medium comprising instructions which, when executed by a processor at a node in a network having a connection-oriented network layer having protection measures associated therewith, cause the processor to perform a method of fault monitoring in accordance with the third aspect of the invention.

In accordance with a fifth aspect of the invention there is provided a machine readable medium having stored therein at least a type field value for a Type-Length-Value network layer protection message, the type field value identifying a DoNotSwitch-type network layer protection message type for inhibiting switching of a network layer working path. The provision of the type field value enables the creation of a DoNotSwitch-type second network layer protection message for onward transmission within the second network layer, and the recognition of the receipt of a DoNotSwitch-type second network layer protection message at the receiving second network layer node.

Finally, in accordance with further aspects of the invention there are provided fault monitoring entities, and network nodes incorporating those network entities, corresponding to the methods of the invention outlined above.

BRIEF DESCRIPTION OF THE DRAWINGS

To show how the invention may be brought into effect, reference will now be made, by way of example, to the accompanying drawings, in which.

DETAILED DESCRIPTION

The present invention will now be described with reference to the accompanying drawings.

Figure 1:
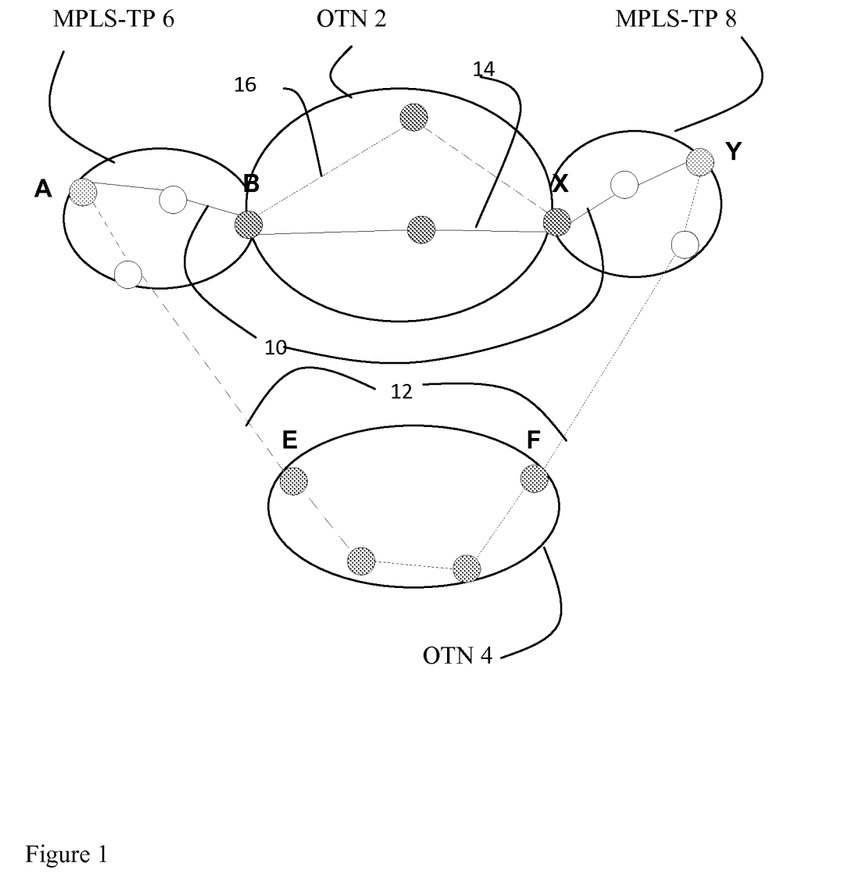
FIG. 1 shows a network arrangement formed from a plurality of inter-connected networks.
Figure 2:
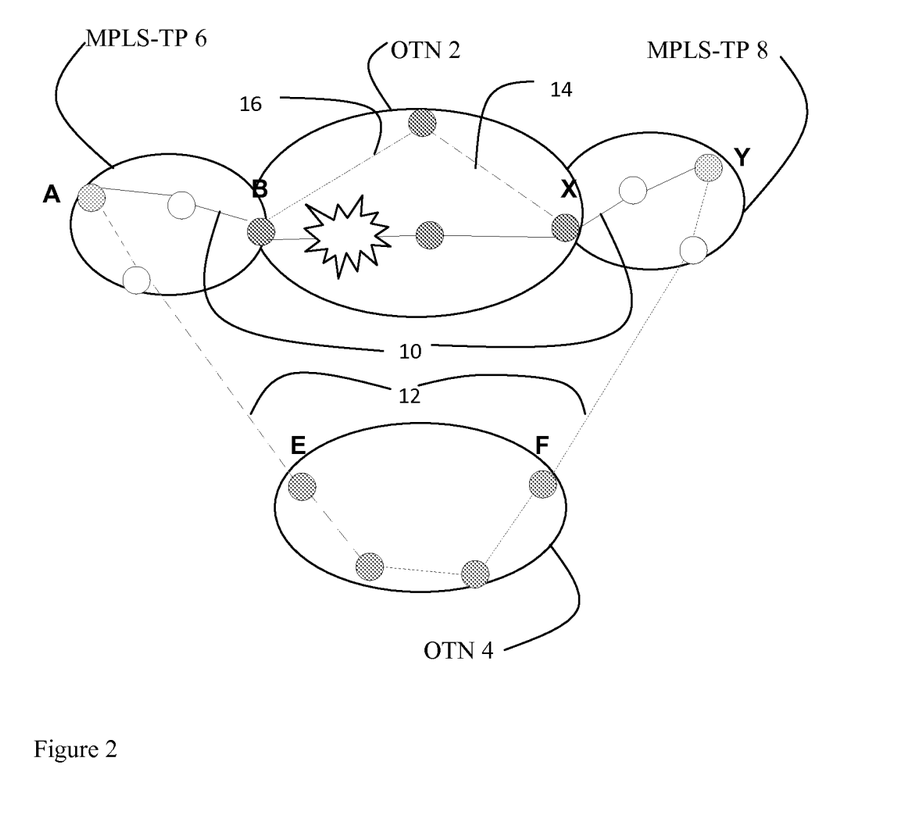
FIG. 2 shows the network arrangement of FIG. 1 showing the location of a first fault.
Figure 3:
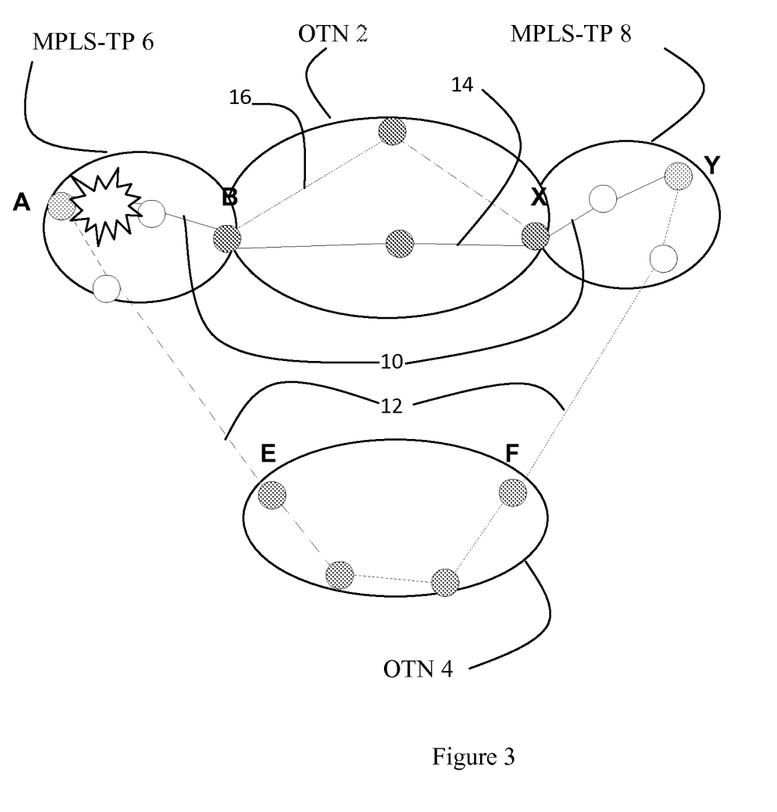
FIG. 3 shows the network arrangement of FIG. 1 showing the location of a second fault.

FIGS. 1-3 show a typical network arrangement. The network arrangement shown in FIGS. 1-3 is expected to be common during migration from existing optical transport (OTN) networks to Multi Protocol Label Switching Transport Profile (MPLS-TP) networks. MPLS-TP is currently under standardisation in the Internet Engineering Task Force (IETF) as a transport profile for Multi Protocol Label Switching (MPLS), and it is expected to ensure a similar look and feel as legacy networks with inherent interoperability capability with the existing MPLS networks.

The result of this migration may be a network arrangement such as that shown in FIG. 1 where part of the network arrangement, for example a metro/core network, remains as an OTN network and other parts of the network arrangement, for example an access/metro network is migrated to a packet-based network based on MPLS-TP.

It should be noted that although the network arrangement in FIGS. 1-3 is shown as an example of a possible arrangement in which embodiments of the invention may be used, the invention is not limited to use in OTN/MPLS-TP networks but is applicable to homogenous and heterogeneous networks arrangements using a wide variety of different technologies, as will be apparent to a skilled person having regard to the following description.

In FIGS. 1-3 two legacy (OTN) networks forming core networks 2, 4 and two (MPLS-TP) networks 6, 8 are shown.

In order to send data traffic between node A of MPLS-TP network 6 and node Y of MPLS-TP network 8, an MPLS-TP network layer is established between node A of MPLS-TP network 6 and node Y of MPLS-TP network 8. An MPLS-TP working path 10 is established between nodes A and Y via OTN network 2, passing through OTN network 2 edge nodes B and X. An MPLS-TP network layer standby path 12 is also established between the network nodes A and Y via the OTN network 4, passing through edge nodes E and F. Thus the MPLS-TP network layer working path 10 passes through nodes ABXY whilst the MPLS-TP standby path 12 is routed through nodes AEFY.

Within the MPLS-TP working path 10 and the MPLS-TP standby path 12 a number of logical entities are also created between consecutive nodes along the working path 10, which require exchange of traffic between them. These logical entities are associated with Label Switched Paths (LSPs) and are characterised by a packet header label used for routing packets along the path. Thus, received packets having a header label are routed by each node to the next node in the working path corresponding to the label.

Fault protection mechanisms are provided in the MPLS-TP network layer. One fault protection mechanism is based on continuity check (CC) packets, provided by the OAM protocols, which are sent from one end node of the MPLS-TP network layer protection instance to the other end node of the protection layer instance, in this case from node A to node Y. When the OAM CC messages are no longer received at node Y, a fault in the MPLS-TP working path 10 can be determined and fault protection mechanisms triggered. In particular, the switch from the MPLS-TP working path 10 to the previously established MPLS-TP standby path 12 can be initiated.

In the network arrangement shown in FIGS. 1-3, part of the MPLS-TP network layer working path 10 is carried by the OTN network 2 between nodes B and X. An OTN network layer is established between node B and node X of OTN network 2. An OTN working path 14 is established between nodes B and X of OTN network 2 and OTN standby path 16 is also established between the network nodes B and X of the OTN network 4.

The OTN network 2 also has its own protection measures in place. These protection measures, including OTN OAM protection messages sent within the OTN network layer from node B to node X, enable node X to determine whether a fault exists in the OTN working path 14 and therefore whether a switch to OTN standby path 16 should be made.

FIG. 2 illustrates a situation where a fault occurs within the OTN working path 14 between nodes B and X. OTN OAM CC protection messages being sent from node B to node X are now no longer received by node X and therefore node X determines a fault of the OTN working path 14. In response to the detected fault, the network node X initiates a switch of the OTN data traffic from the existing OTN working path 14 to the OTN standby path 16.

In addition, node Y also detects a fault in the MPLS-TP network layer since the MPLS-TP OAM CC messages are not now being received by node Y. As a result, node Y initiates a switch of the MPLS-TP traffic data from the MPLS-TP working path 10 to the MPLS-TP standby path 12 already established through nodes AEFY of OTN network 4. Thus it can be seen than a single fault within the working path 14 of the OTN network 2 can result in the switching from the working path to a standby path in both the OTN network layer and the MPLS-TP network layer.

In order to avoid network instability and this undesirable behaviour, a hold-off timer may be used in the MPLS-TP network layer node Y such that switching of the MPLS-TP network layer traffic from the MPLS-TP working path 10 to the MPLS-TP standby path 12 is not initiated for a hold-off period after detection of missing MPLS-TP OAM CC messages. In this way, the OTN network 2 is allowed sufficient time to recover a fault in the OTN network layer and the MPLS-TP network layer traffic is only switched to the MPLS-TP standby path 12 if the OTN network is not recovered within the hold-off period.

In the fault situation illustrated in FIG. 3 in which a fault occurs within the MPLS-TP network 6 between nodes A and B, the use of a hold-off timer at node Y to delay switching of the MPLS-TP network layer working path 10 after detection of a fault situation merely results in a delay to the switching and makes it more difficult, if not impossible, to meet a fault protection time target required for the transport network. For example, in some embodiments a target time of 50 ms for fault protection switching is required.

Embodiments of the present invention will now be described with reference to FIGS. 4-11 of the accompanying drawings.

Figure 4:
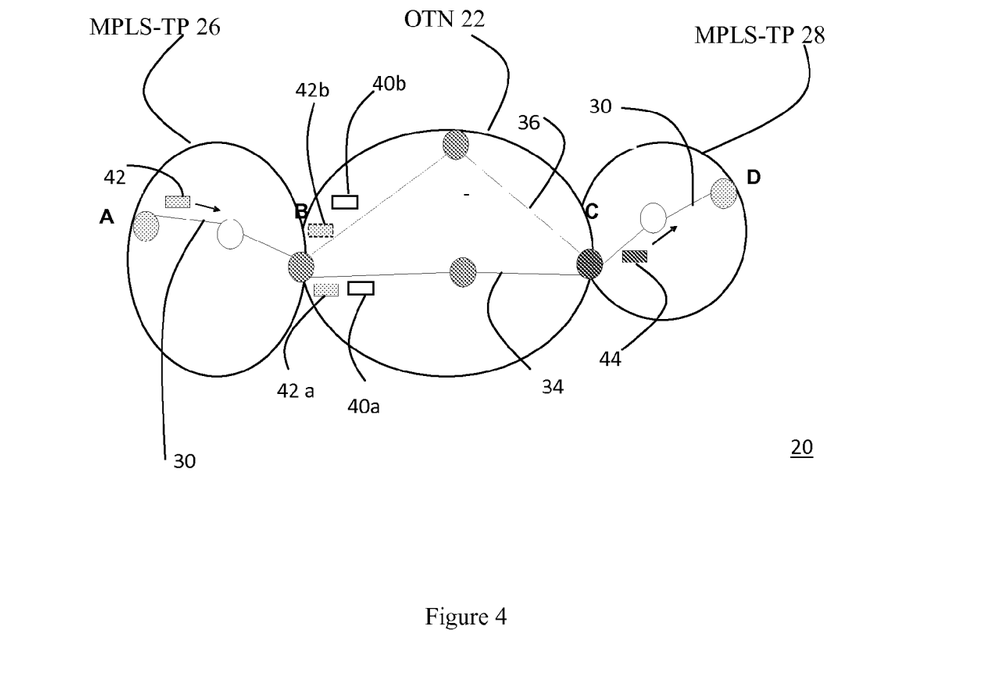
FIG. 4 illustrates a first embodiment within a network 20 similar to the network arrangement shown in FIGS. 1-3.
Figure 5:
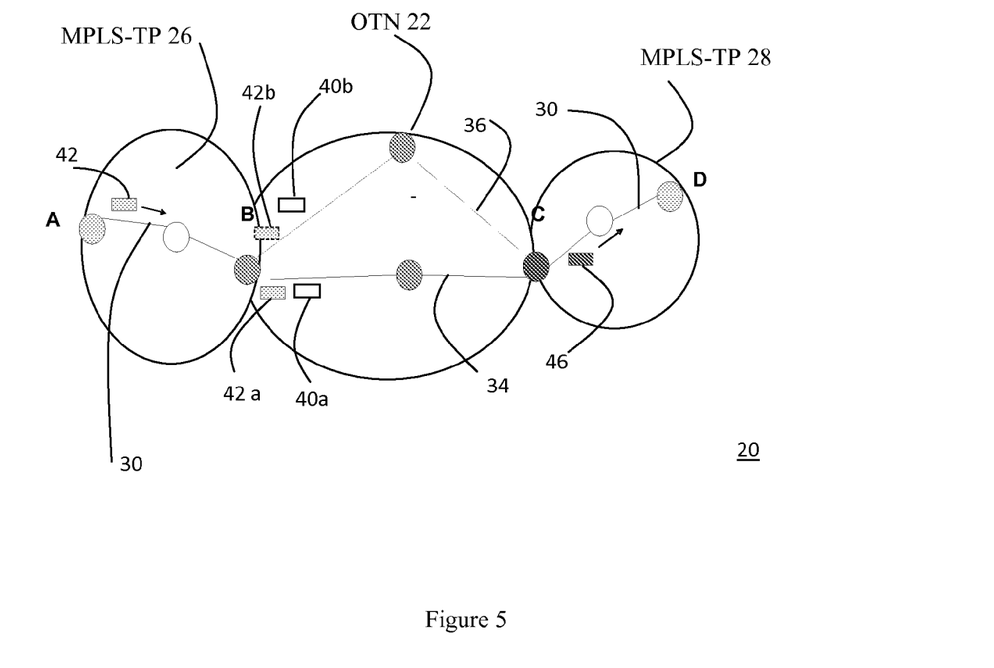
FIG. 5 illustrates a second embodiment within a network 20 similar to the network arrangement shown in FIGS. 1-3.

FIGS. 4 and 5 show embodiments of the invention within a network 20 similar to the network arrangement shown in FIGS. 1-3. In FIGS. 4 and 5 the MPLS-TP network layer standby path has been omitted, for clarity, but it will be understood by a skilled person that such an MPLS-TP network layer standby path would be present.

In FIGS. 4 and 5 MPLS-TP networks 26, 28 are arranged as metro/access networks and OTN network 22 is arranged as a core metro network. As previously, it should be noted again that the invention is not limited to the specific arrangements and technologies shown, but embodiments of the invention can be applied in a wide variety of technological situations.

In FIGS. 4 and 5, an MPLS-TP network layer is established between network node A in MPLS-TP network 26 and network node D in MPLS-TP network 28 via nodes B and C, which are the edge nodes of OTN network 22. As in the arrangement shown in FIGS. 1-3 discussed previously, an MPLS-TP working path 30 is established between end nodes A and D (as well as an MPLS-TP standby path, which is not shown). Part of the MPLS-TP network layer working path 30 is carried by the OTN network 22 between nodes B and C.

An OTN network layer is established between node B and node C of OTN network 22. An OTN working path 34 is established between nodes B and C of OTN network 22 and OTN standby path 36 is also established between the network nodes B and C of the OTN network 4.

The OTN network 22 provides fault protection measures, including OTN OAM messages 40a and 40b that are sent respectively on the OTN working path 34 and the OTN standby path 36. Network node C monitors the fault protection measures, such as the OTN OAM messages 40a 40b received from node B, in order to determine the status of the relevant paths in the OTN network. In this embodiment, the network node C monitors the OTN working path 34 for received OTN OAM messages, in order to determine whether a fault exists on the OTN network working path 34. The network node C also monitors the OTN standby path 36 for received OTN OAM messages, in order to determine whether a fault exists on the OTN network standby path 34.

In addition, the MPLS-TP CC messages 42 are also sent from node A to network node B within the MPLS-TP network layer. The node B handles the MPLS-TP CC messages in the same manner as the data traffic and sends the MPLS-TP OAM CC messages from node B to node C within the OTN network layer encapsulated as OTN messages 42a 42b on the OTN network layer working path 34 and the OTN network layer standby path 36 respectively.

Instead of merely forwarding the MPLS-TP CC information encapsulated in OTN messages 42a 42b received at node C as MPLS-TP CC messages sent in the MPLS-TP network layer to node D, in embodiments of the invention the MPLS-TP OAM CC information received in OTN messages 42a 42b is extracted and monitored within node C. This allows node C to determine the status of the MPLS-TP network layer. In addition, the node C also monitors the OTN CC messages 40a 40b packets received at node C to determine the status of the OTN network.

From the OTN OAM CC messages 40a and 40b received at node C, the node C is able to establish the status of the OTN network layer. From this information, node C can establish whether a detected fault can be recovered in the OTN network layer without a switch in the MPLS-TP network layer, or whether the fault is such that the MPLS-TP network layer is required to switch data traffic to the MPLS-TP network layer standby path (not shown in FIGS. 4 and 5). This situation may occur if the OTN network layer is unable to recover a fault occurring within the OTN network 22, or may occur if the fault has occurred within the MPLS-TP network 26 for example as in the situation analogous to that shown in FIG. 3. A fault occurring within MPLS-TP network 26, as in the situation analogous to that shown in FIG. 3 can be determined from the MPLS-TP CC message information monitored at node C. Therefore, as will be described later, the node C has sufficient information, from monitoring the MPLS-TP network layer and the OTN network layer, to determine whether or not the node D should perform an MPLS-TP network layer switch. Therefore, if a switch in the MPLS-TP network layer is not required despite a fault having occurred, node C creates and sends a switch-inhibiting MPLS-TP network layer message to node D, which ensures that node D does not switch to the MPLS-TP network layer standby path. This results in increased stability of the network, since switching of the MPLS-TP network layer is not carried out unless necessary. In addition, any switching of the MPLS-TP network layer working path that is necessary can be accomplished in less time than would typically be required with the use of hold-off timers.

In one embodiment of the invention, as shown in FIG. 4, this outcome is achieved by the node C creating and sending to node D within the MPLS-TP network layer an MPLS-TP CC message 44. In this embodiment, node D is unaware of any fault within the network 20 or interruption of MPLS-TP CC messages, since MPLS-TP network layer CC messages are being received as expected. As a result, the network node D does not perform switching of the data traffic of the MPLS-TP working path 34 to the MPLS-TP standby path 36.

In another embodiment, as shown in FIG. 5, the node C prevents the node D from performing an unnecessary MPLS-TP network layer switch by generating and sending to Node D a DoNotSwitch OAM message 46 indicating to node D that switching of the MPLS-TP network layer is not required, despite an interruption to the MPLS-TP CC messages.

Figure 6:
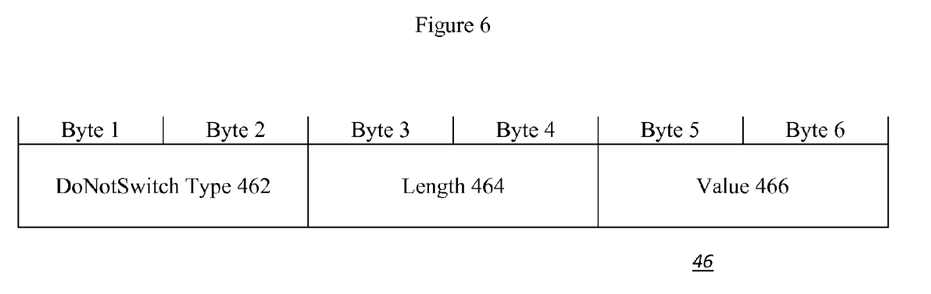
FIG. 6 shows an exemplary message in accordance with one embodiment.

An exemplary DoNotSwitch message 46 is shown in FIG. 6. The exemplary DoNotSwitch message 46 shown in FIG. 6 is a Type/Length/Value (TLV) message to be added to the OAM message set. The exemplary DoNotSwitch message 46 has a first type field 462 of 2 bytes which indicates the DoNotSwitch type. The value of this field identifies this OAM message as a DoNotSwitch-type message within the OAM message set. Next a length field 464 of 2 bytes indicates the length of a value field. In the exemplary embodiment, the value of this field is 2. Finally a two byte value field 466 is included. However, as will be apparent to a skilled person, many different configurations of a DoNotSwitch message may be implemented within different systems in accordance with different embodiments of the invention.

As can be seen in the embodiments shown in FIG. 4 and FIG. 5 the message sent to node C to Node D is a switch-inhibiting MPLS-TP layer protection message which in both cases will prevent the network node D from switching the MPLS-TP network layer working path unnecessarily when the OTN network layer can recover the fault.

Figure 7:
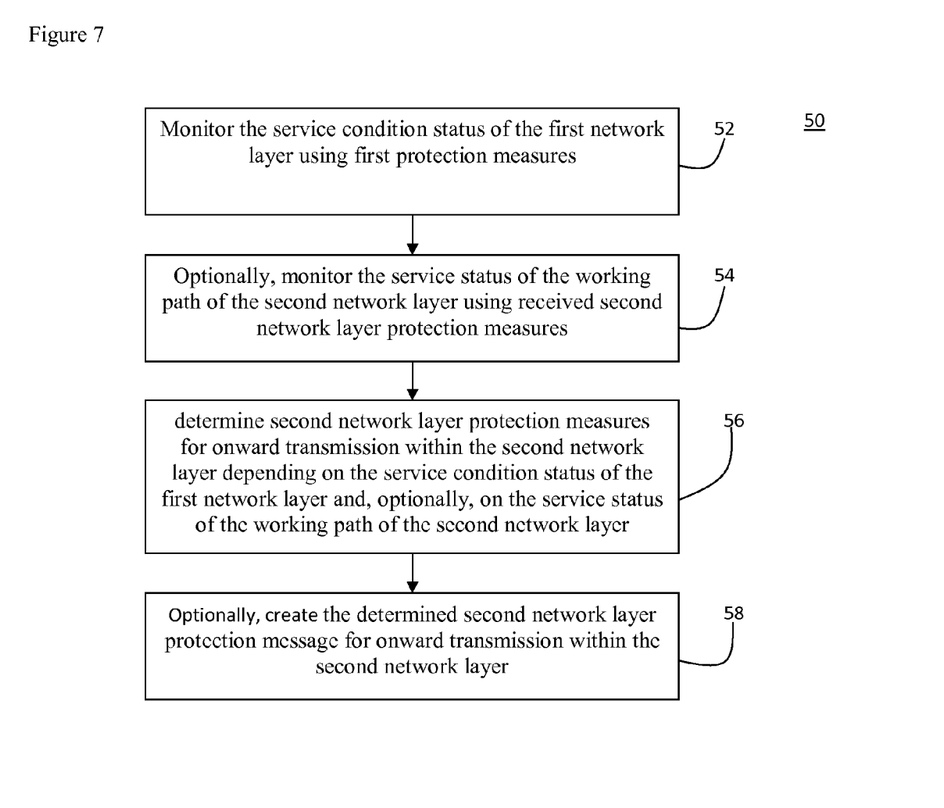
FIG. 7 is a flowchart illustrating method steps in a fault monitoring method in accordance with embodiments.

FIG. 7 shows a method of fault monitoring 50 in a fault monitoring entity of a network node in accordance with embodiments of the invention.

In a first step, 52, the service condition status of a first network layer is monitored using the fault protection measures of the first network layer. In the exemplary embodiment, the node C monitors the status of the OTN network layer using the OTN OAM CC messages 40a, 40b.

In step 54, which may be optional in some embodiments of the invention, the node C monitors the service state of the working path of the second network layer using received second network layer protection measures. In the described embodiment, the working path of the MPLS-TP network layer is monitored using the MPLS-TP CC measures received at Node C in OTN messages 42a 42b.

Next, in step 56, the Node C determines second network layer protection measures for onward transmission within the second network layer depending upon the service condition status of the first network layer and, optionally, depending upon the service status of the working path of the second network layer. Thus, in the described embodiment, the node C determines whether an MPLS-TP network layer DoNotSwitch message should be generated, or whether a new MPLS-TP CC message should be generated, or the MPLS-TP CC message received at node C should be forwarded within the MPLS-TP network layer, depending upon the status of the OTN network layer and on the service status of the working path of the MPLS-TP network layer.

If in step 56 it is determined that a message should be sent within the second network layer then optionally, in step 58, the second network layer protection messages for onward transmission within the second network layer are created. Thus, in the described embodiments, the MPLS-TP network layer DoNotSwitch message or the MPLS-TP OAM CC message are created.

Figure 8:
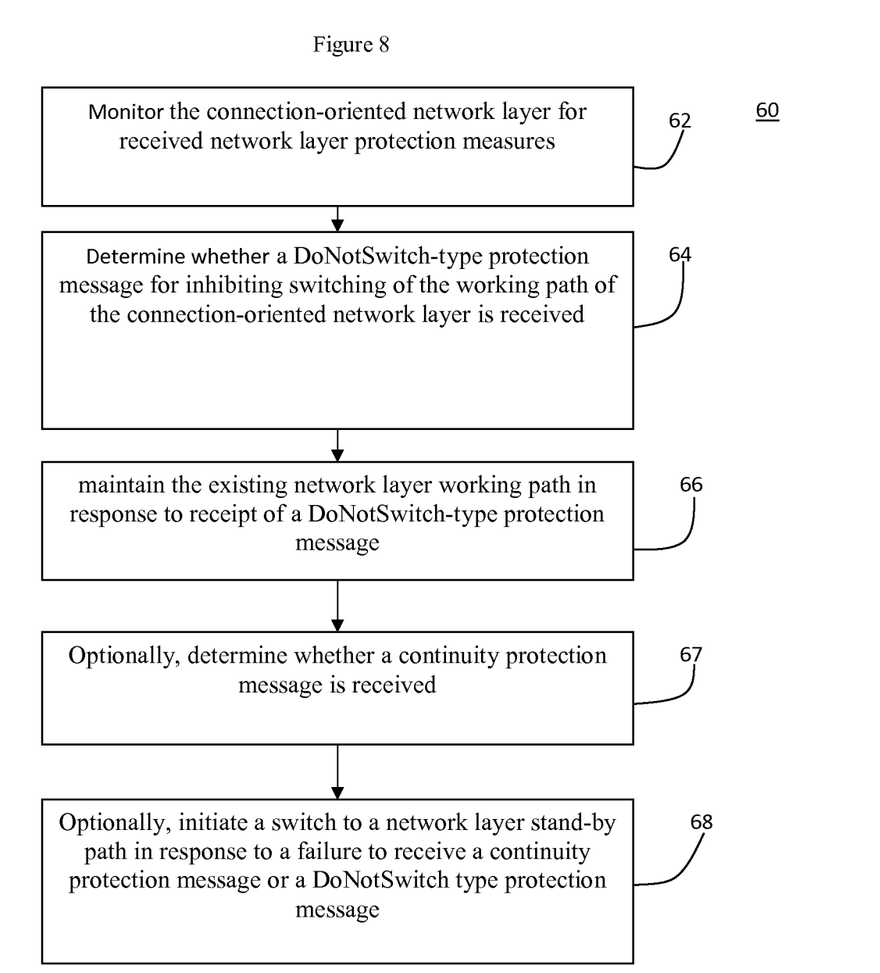
FIG. 8 is a flowchart illustrating method steps in a fault monitoring method in accordance with embodiments.

FIG. 8 shows a method 60 of fault monitoring in a fault monitoring entity of a network node in accordance with embodiments of the invention.

It should be noted that in the embodiment of FIG. 4 the operation of the Node D in the MPLS-TP network is unaffected by the change in operation of the Node C. Therefore the described method 60 of fault monitoring in a fault monitoring entity in a network may be used in the node D of the exemplary embodiment shown in FIG. 5.

In step 62, the connection-oriented network layer is monitored by the fault monitoring entity for network layer protection messages. Thus, in the described embodiment shown in FIG. 5, node D monitors the MPLS-TP OAM messages being received on the MPLS-TP working path from node C.

In step 64, it is determined whether a switch-inhibiting message, such as a DoNotSwitch type protection message 46, for inhibiting switching of the working path of the connection-oriented network layer working path, is received.

In this case, in step 66, the node D maintains the existing network layer working path in response to the receipt of the switch-inhibiting message, such as the DoNotSwitch-type protection message 46 of the described embodiment.

Thus, in the exemplary embodiment described with reference to FIG. 5, if the Node D receives DoNotSwitch-type OAM message 46 from the Node C in the MPLS-TP network layer, the Node D continues to monitor the existing network layer working path 30 and takes no action to switch the MPLS-TP traffic data to the MPLS-TP standby path.

In addition, in step 67, in embodiments of the invention, it is determined whether a continuity protection message, for example a CC OAM message, is received, and in step 68 a switch to the network layer standby path is initiated in response to a failure to receive a continuity protection message or a DoNotSwitch-type protection message.

In the exemplary embodiment described with reference to FIG. 5, therefore, if the node D does not receive a DoNotSwitch-type OAM message 46 or a conventional OAM CC message at the expected time from the node C in the MPLS-TP network layer, the node D will initiate a switch of the MPLS-TP traffic data from the working path to the MPLS-TP standby path.

Figure 9:
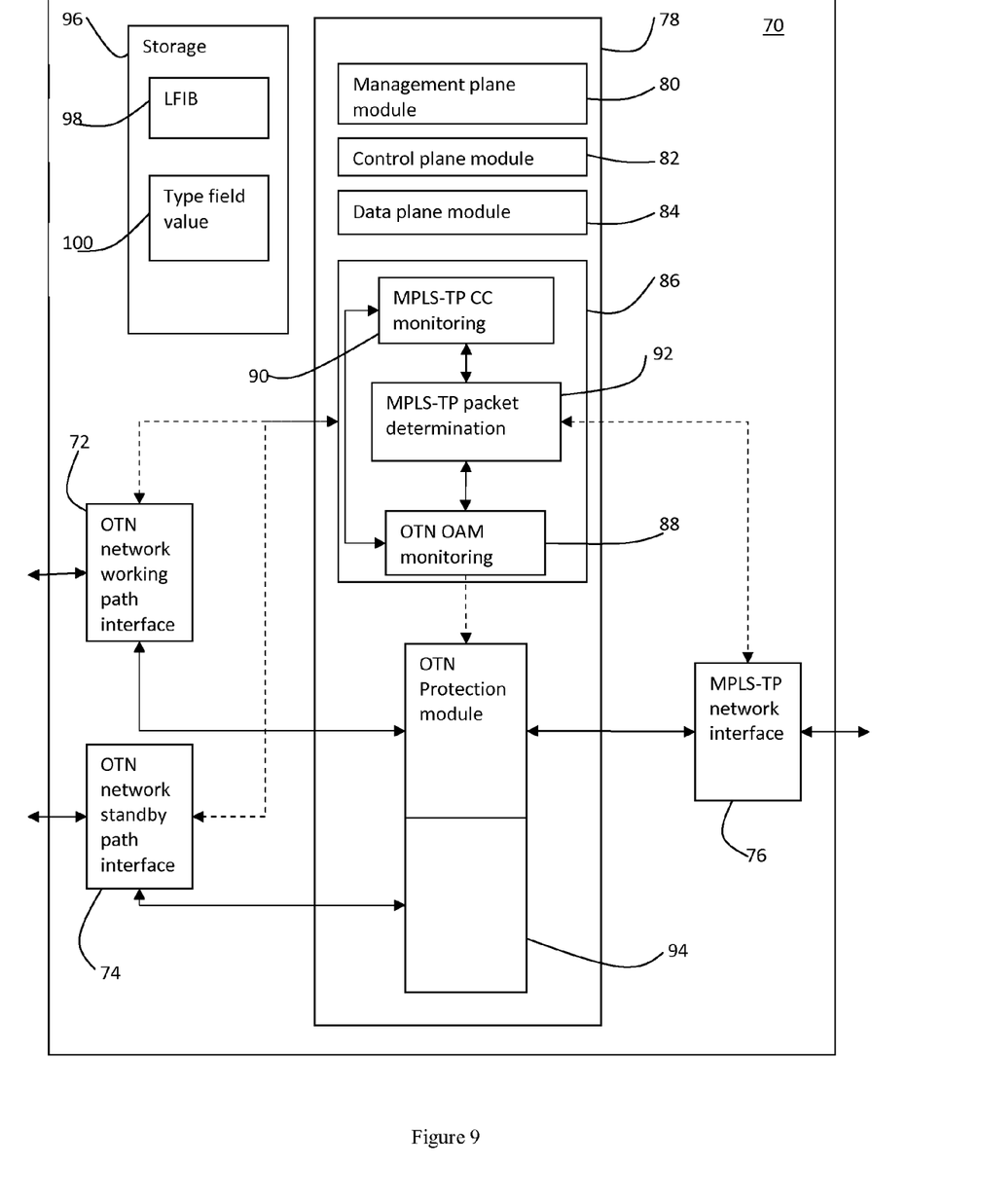
FIG. 9 is a schematic diagram of an exemplary embodiment of a network node.

FIG. 9 shows an exemplary embodiment of a network node 70 for implementing embodiments of the invention. The network node 70 can be used as the network node C in the embodiments described above with reference to FIGS. 4 and 5, and therefore will be described in the context of first OTN network layer and a second MPLS-TP network layer. However, it will be apparent to a skilled person that the invention is not limited to this technological implementation.

A network node C 70 has an OTN network working path interface 72 and an OTN network standby path interface 74 for sending data packets to and receiving data packets from other network nodes in the OTN network. In addition, the network node C has also an MPLS-TP network interface 76 for sending data packets to and receiving data packets from other network nodes in an MPLS-TP network.

The network node C 70 is provided with a controller 78, having a plurality of functional modules (80-94) for controlling different aspects of the operation of the network node 70. In the exemplary embodiment controller 78 has a management plane module 80; a control plane module 82; a data plane module 84; an OAM monitoring module 86, having an OTN CC monitoring function 88, an MPLS-TP CC monitoring function 90 and an MPLS-TP packet determination function 92; and an OTN protection module 94.

Typically in some embodiments the controller might be implemented as a processor under the control of a software program having the modular functions described herein. In other embodiments a hardware arrangement may be used, as determined by a skilled person. In addition, in some embodiments the functional modules may be arranged differently or may be omitted entirely.

In addition, the exemplary network node C 70 shown in FIG. 9 is provide with storage 96 in which is stored at least data forwarding information (Label Forwarding Information base LFIB)) 98 and type field value information 100. Typically, the network node C 70 will be provided with a bus (not shown) enabling data packets to be moved within the exemplary network node C 70, and enabling data to be stored in and/or read from storage 96. Again, the storage may be implemented in many different ways as will be apparent to a skilled person.

The working path interface 72 and the standby path interface 74 are each coupled to MPLS-TP network interface 76 under the control of OTN protection module 94. In addition, the OTN network working path interface 72 and the OTN network standby path interface 74 are also coupled to the OAM monitoring module 86 in order to pass data packets containing OTN OAM CC protection messages and MPLS-TP OAM CC messages to the OTN OAM monitoring function 88 and the MPLS-TP CC monitoring function 90 of OAM monitoring module 86, respectively.

The MPLS-TP packet determination function 92 is coupled to the MPLS-TP CC monitoring function 90 and the OTN CC monitoring function 88 to receive information relating to the monitored CC messages of the OTN network layer and the MPLS-TP network layer. The MPLS-TP packet determination function 92 is also coupled to the MPLS-TP network interface 76 to provide MPLS-TP OAM messages thereto as will be explained in more detail in the following description. Finally, OTN OAM monitoring function 88 is coupled to the OTN protection module 94.

The controller 78 comprises functional modules that control operation of the network node. The management plane module 80 performs signalling with network management entities located elsewhere in the network and a control plane module 82 exchanges signalling and routing information with other network nodes in order to determine the forwarding data 98 stored in storage 96. In IETF terminology, the forwarding data is called Label Forwarding Information Base (LFIB).

The data plane module 84 controls the switching of the data transport units (eg packets or frames of data) from the other network nodes received by the OTN network working path interface 72 or the MPLS-TP network interface 76 and determines the network node to which the incoming transport unit should be forwarded depending on the forwarding data (LFIB) 98. The OAM monitoring module 86 supports OAM functionalities, such as continuity check signalling, to detect the occurrence of a link or a node failure. The data plane forwarding module performs label look up and switching to support forwarding of received transport units (packets) using the forwarding data (LFIB) 98. The OTN protection module 94 performs the function of controlling the switching of traffic from the OTN network working path interface 72 to the OTN network standby path interface 74 when a failure is detected by the OTN OAM monitoring function 88 of the OAM monitoring module 86.

This set of modules can be implemented as blocks of machine-executable code, which are executed by a general purpose computer, or by one or more dedicated processors or processing apparatus. The modules can be implemented as hardware or a combination of hardware and software. Although the functionality of the apparatus is shown as a set of separate modules, it will be appreciated that a smaller, or larger, set of modules can perform this functionality.

In the exemplary embodiment, the OTN OAM monitoring function 88 performs the step 52 in method 50 of FIG. 7 of monitoring the service condition status of the first network layer, the OTN network layer, using first protection measures, ie the OTN OAM messages that are received by the OTN working path interface 72 and passed to the OTN OAM monitoring function 88.

The MPLS-TP CC monitoring function 90 of OAM monitoring module 86 performs the optional step 54 of method 50 of FIG. 7 of monitoring the service status of the working path of the MPLS-TP network layer, using the received second network layer protection measures ie the MPLS-TP CC messages.

The MPLS-TP packet determination function 92 is coupled to the MPLS-TP OAM monitoring function 90 and the OTN OAM monitoring function 88 and receives therefrom the status of the MPLS-TP network layer working path and from this information performs the step 56 of method 50 of FIG. 7 of determining MPLS-TP network layer protection measures for onward transmission within the MPLS-TP network layer. If necessary, the MPLS-TP protection message for onward transmission within the MPLS-TP network layer is created by the MPLS-TP packet determination function 92 in step 58 of method 50 of FIG. 7, and the resulting MPLS-TP OAM packet is passed to the MPLS-TP network interface 76 for onward transmission within the MPLS-TP network layer.

If the MPLS-TP packet determination function 92 determines that a DoNotSwitch-type OAM message should be created for onward transmission within the MPLS-TP network layer, in the exemplary embodiment the MPLS-TP packet determination function 92 accesses the type field value information 100 stored in storage 96 in order to create the DoNotSwitch OAM message 46 for onward transmission within the MPLS-TP network layer.

Figure 10:
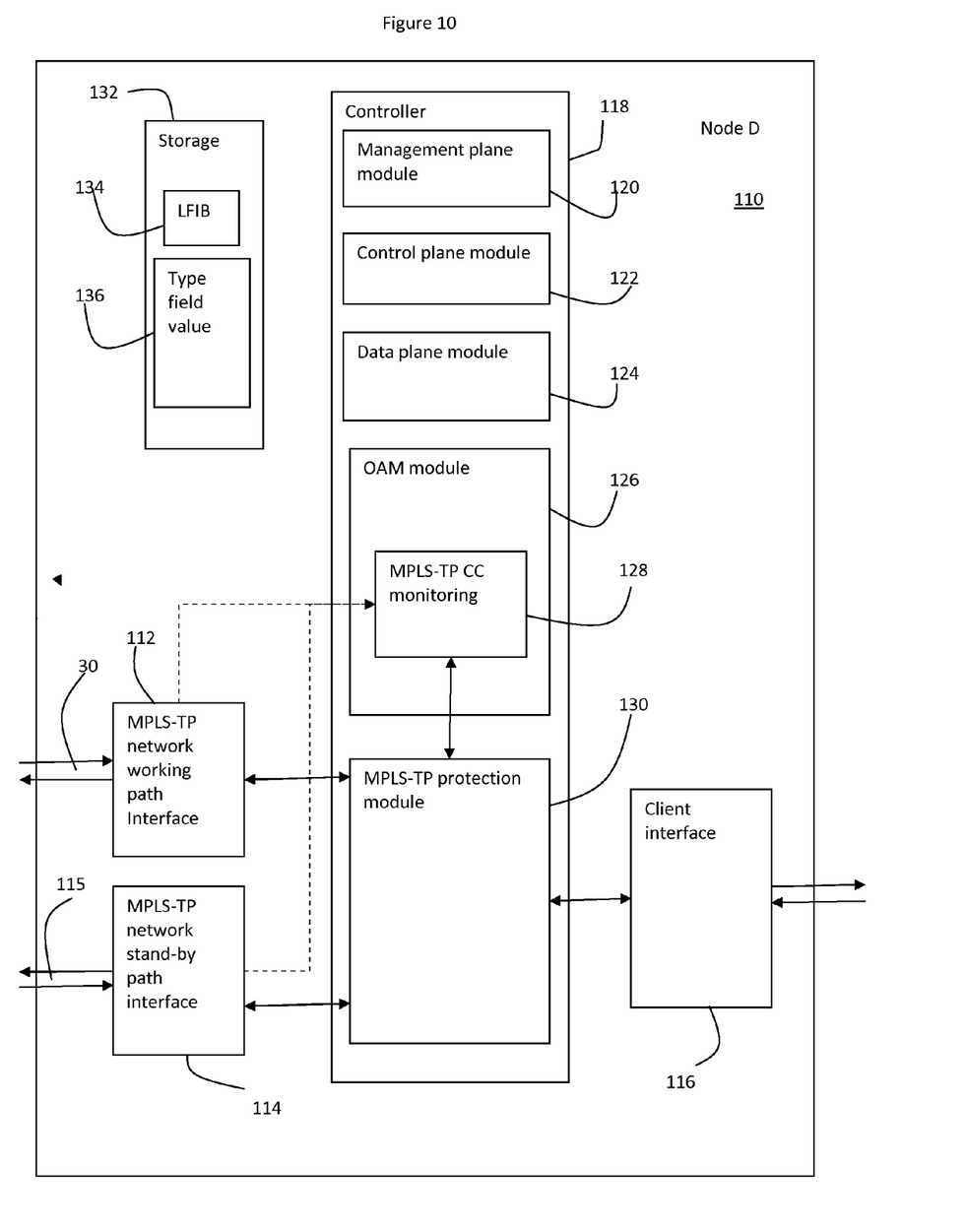
FIG. 10 is a schematic diagram of an exemplary embodiment of a network node.

FIG. 10 is a schematic diagram of a node D 110 in the exemplary embodiment shown in FIG. 5. The network node D 110 has an MPLS-TP network working path interface 112 and an MPLS-TP network stand-by path interface 114 for sending data packets to and receiving data packets from other network nodes in the MPLS-TP network layer on the MPLS-TP working path 30 and MPLS-TP standby path 115 respectively. In addition, the network node D 110 has a client interface 116 for providing data packets to a client.

The network node D 110 also has a controller 118 comprising a set of functional modules 120-130 which control the operation of the network node 110. A management plane module 120 performs signalling with network management systems at other nodes in the network and a control plane module 122 exchanges signalling and routing messages with other nodes in the network. A data plane forwarding module 124 performs label look up and switching of the data packets to support forwarding of received transport units (packets). The fault monitoring (OAM) module 126 supports OAM functionalities such as continuity check signalling to detect the occurrence of a link or a node failure. In particular, the fault monitoring OAM module 126 has an MPLS-TP CC monitoring function 128. Finally, an MPLS-TP protection module 130 performs the function of switching the data traffic to the standby path when a failure is detected.

In addition, the exemplary node D 110 shown in FIG. 10 is provided with storage 132 in which is stored at least forwarding data (LFIB) 134 and type field value information 136. Typically, the network node D 110 will be provided with a bus (not shown) enabling data packets to be moved within the exemplary network node D110, and enabling data to be stored in or read from storage 132. Again, the storage may be implemented in many different ways as will be apparent to a skilled person.

This set of modules can be implemented as blocks of machine-executable code, which are executed by a general purpose computer, or by one or more dedicated processors or processing apparatus. The modules can be implemented as hardware or a combination of hardware and software. Although the functionality of the apparatus is shown as a set of separate modules, it will be appreciated that a smaller, or larger, set of modules can perform this functionality.

The MPLS-TP CC monitoring function 98 shown in the exemplary embodiment of node D performs the fault monitoring method 60 shown in FIG. 8. Thus, the MPLS-TP CC monitoring function 128 monitors the MPLS-TP OAM packets received from the MPLS-TP network working path interface 112 in step 62 and in step 64 determines whether a DoNotSwitch-type protection message for inhibiting switching of the working path of the MPLS-TP network layer has been received.

In the exemplary embodiment, the MPLS-TP CC monitoring function 128 compares the type value received on a received OAM message with the type value information 136 stored in storage 132 to determine whether a DoNotSwitch-type message 46 has been received. If the MPLS-TP CC monitoring function 128 determines that a DoNotSwitch-type protection message 46 has been received, in step 64, the MPLS-TP monitoring function 128 continues to monitor packets received from the network interface, in step 66.

Similarly, the MPLS-TP CC monitoring function 128 operates to determine whether a packet received from the MPLS-TP network working path interface 122 is an MPLS-TP CC message in step 67. A switch to a network layer standby path is initiated in response to a failure to receive a network layer continuity message or a DoNotSwitch-type protection message, in step 68 of the method 60 of FIG. 8.

The operation of the node C 70 shown in FIG. 9 and the node D 110 shown in FIG. 10 and the network 20 as a whole in an exemplary intrusive mode embodiment as shown in FIG. 4 and in an exemplary non-intrusive mode embodiment as shown in FIG. 5, will now be explained with reference to FIG. 11.

Figure 11:
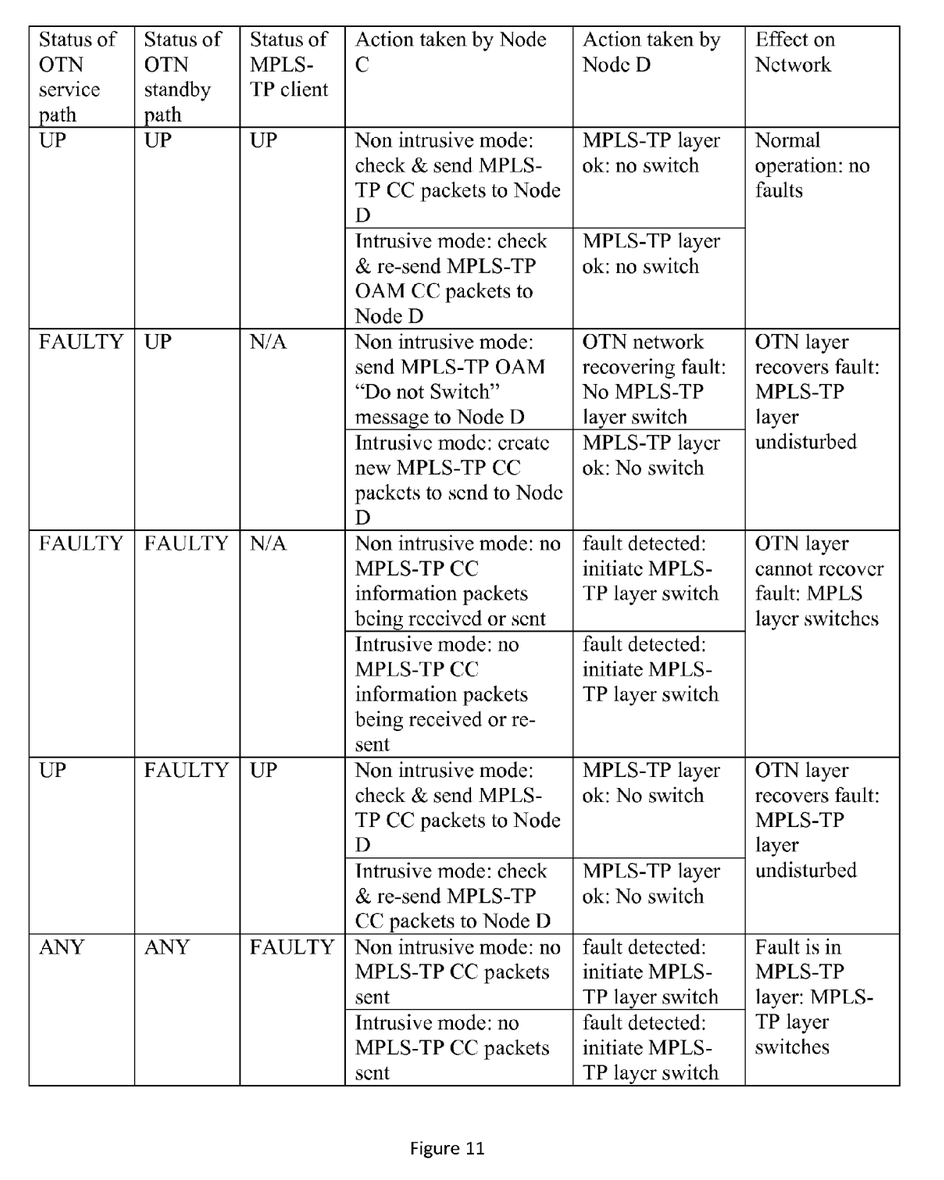
FIG. 11 is a table illustrating the operation of the network nodes of a network arrangement as well as the network arrangement as a whole of exemplary embodiments.

In the first situation shown in FIG. 11 in the node C, the OTN OAM monitoring function 88 receives OTN OAM messages from the OTN network working path interface 72 and OTN network standby path 74 and determines that the OTN service path and the OTN standby path are both operational. The MPLS-TP CC packet information received by the OTN network path interface 72 and the OTN network standby path interface 74 are passed to the MPLS-TP CC monitoring function 90 and from this the MPLS-TP CC monitoring function 90 determines that the MPLS-TP client is operational.

In the non-intrusive mode the MPLS-TP CC message information is passed from the OTN working path interface 72 to the MPLS-TP interface 76 as normal whilst simultaneously being checked in the MPLS-TP CC monitoring function 90. Since the MPLS-TP network layer and the OTN network layer are both operational, the MPLS-TP packet determination function 92 takes no action.

In the intrusive mode, in response to the determination that the OTN network is operational and the MPLS-TP network layer is operational, the MPLS-TP packet determination function 92 recreates an MPLS-TP CC packet using the received MPLS-TP CC information and forwards this to MPLS-TP network interface 76 for onward transmission within the MPLS-TP network layer.

The network node D 110 receives MPLS-TP CC packets as expected and therefore no action is taken to switch the MPLS-TP network layer working path. The effect on the network is normal operation as there are no faults.

In the second situation shown in FIG. 11, in node C 70 the OTN OAM monitoring function 88 receives the expected OTN OAM messages from the OTN network standby path interface 74 but not from the OTN network working path interface 72. From this information the OTN OAM monitoring function 88 can determine that the OTN network working path is faulty and the OTN standby path is operational. Failure recovery can be performed within the OTN network layer, but a discussion of the recovery mechanism is outside the scope of this invention.

In this situation, the MPLS-TP packet determination function 92 has sufficient information to determine that the fault within the OTN network layer can be recovered, and that it is not necessary to disturb the MPLS-TP network layer. During the OTN network layer failure recovery mechanism, the following actions taken by node C are described.

In the intrusive mode, therefore, in response to the information received from the OTN OAM monitoring function 88, the MPLS-TP packet determination function 92 determines (step 56 FIG. 7) and creates (step 58 FIG. 7) a switch-inhibiting message to send the node D. The switch-inhibiting message in the exemplary embodiment is an MPLS-TP CC message to be sent to node D with the same information and periodicity of time as the previously received MPLS-TP CC message information. The purpose of this message created by MPLS-TP packet determination function 92 is to emulate path continuity and hence inhibit switching of the MPLS-TP network working path to the MPLS-TP standby path by the Node D.

In the non-intrusive mode, in response to the information received from the OTN OAM monitoring function 88, the MPLS-TP packet determination function 92 determines (step 56 FIG. 7) and creates (step 58 FIG. 7) a switch-inhibiting message to send the node D. The switch-inhibiting message in the exemplary embodiment is the DoNotSwitch message 46 shown in FIG. 6, and the type field value information 100 stored in storage 96 is used to create this message. In each case, the MPLS-TP OAM determination function 92 forwards the created packet to the MPLS-TP network interface 76 for onward transmission within the MPLS-TP network.

In this embodiment, it is only when the OTN network layer is recovered that the MPLS-TP CC monitoring function 90 receives MPLS-TP CC information via the working OTN network layer standby path, and therefore MPLS-TP messages can be checked & sent to node D again. In other embodiments, the MPLS-TP CC monitoring function 90 may receive MPLS-TP CC information via the working OTN network layer standby path, and therefore the MPLS-TP CC monitoring function 90 can determine that the MPLS-TP network layer is operational during operation of the OTN network recovery mechanism.

The operation of node D in this situation will now be described.

In the non-intrusive mode the node D receives the DoNotSwitch OAM message 46 at the MPLS-TP network interface 112, and the DoNotSwitch OAM message 46 is then passed to the MPLS-TP CC monitoring function 128. By comparing the field value of the received OAM message with the type value information 136 stored in storage 132 of the exemplary node D 110 shown in FIG. 10 the MPLS-TP CC monitoring function 128 can determine that a DoNotSwitch-type protection message for inhibiting switching of the working path of the connection-oriented MPLS-TP network layer has been received, as in step 64 of FIG. 8. The MPLS-TP CC monitoring function 128 then continues to monitor the existing network layer working path as per step 66 of FIG. 8.

In the intrusive mode, the node D 110 receives the MPLS-TP CC messages as expected, and the MPLS-TP CC monitoring function 128 therefore continues to monitor the working path for OAM messages.

In both the non-intrusive mode and the intrusive mode, therefore, the network node C has sufficient information to determine whether a fault can be rectified in the OTN network layer, or whether the fault cannot be rectified in the OTN network layer. If it is not necessary to switch the MPLS-TP layer, the node C sends switch-inhibiting messages to the node D to ensure that the network node D does not switch the MPLS-TP working path to the MPLS-TP standby path. Therefore the OTN network layer can recover the fault and the MPLS-TP network layer is undisturbed.

In the third situation, the OTN OAM monitoring function 88 of node C 70 (FIG. 9) does not receive OTN OAM messages from either the OTN network working path interface 72 or from the OTN network standby path interface 74, and therefore can determine that the OTN working path and the OTN standby path are both non-operational. On receipt of this status information from the OTN OAM monitoring function 88, the MPLS-TP packet determination function 92 is able to determine that the OTN network layer cannot recover the fault, and that therefore a switch in the MPLS-TP network layer from the current working path to the MPLS-TP standby path is required.

Therefore, in response to the detection of the non-operational status of the OTN network layer by the OTN OAM monitoring function 88, the MPLS-TP packet determination function 92 does not create any MPLS-TP OAM packets in either mode.

In node D 110 (FIG. 10), the MPLS-TP CC monitoring function 128 determines that a continuity protection message has not been received, in step 67, and therefore in step 68 initiates a switch to the MPLS-TP network standby path by sending a control signal to the MPLS-TP protection module 130.

In this situation, since the OTN network layer cannot recover the fault, the MPLS-TP network layer must switch to the standby path. However, the switching to the MPLS-TP standby path is accomplished with the minimum of delay since a hold-off timer is not used.

In the fourth situation, the OTN OAM monitoring function 88 of node C (FIG. 9) detects continuity messages being received from OTN network working path interface 72, but not from OTN network standby path interface 74. The OTN OAM monitoring function 88 can therefore determine that the OTN network layer working path is operational, but that the OTN network layer standby path is not operational. This OTN network status information is then forwarded to the MPLS-TP packet determination function 92. The MPLS-TP OAM monitoring function 90 receives MPLS-TP CC message information from the OTN network working path interface 72, and can therefore establish that the MPLS-TP network layer working path is operational. In this situation, the MPLS-TP packet determination function 92 can determine that it is not necessary to switch the MPLS-TP network layer.

In the non-intrusive mode, therefore, the MPLS-TP CC message information is passed from the OTN working path interface 72 to the MPLS-TP interface 76 for onward transmission in the MPLS-TP network layer whilst simultaneously being checked in the MPLS-TP CC monitoring function 90. Since the MPLS-TP network layer and the working path of the OTN network layer are both operational, the MPLS-TP packet determination function 92 takes no action.

In the intrusive mode, the OTN OAM monitoring function 88 determines that the OTN network working path is operational but the OTN network standby path is faulty. In response to the determination that the OTN network is operational and the working path of the MPLS-TP network layer is operational, the MPLS-TP packet determination function 92 recreates an MPLS-TP CC packet using the received MPLS-TP CC information and forwards this to MPLS-TP network interface 76 for onward transmission within the MPLS-TP network layer.

The network node D 110 (FIG. 10) therefore receives MPLS-TP CC packets as expected and no action is taken to switch the MPLS-TP network layer working path. The effect on the network is that the MPLS-TP network layer is undisturbed while the OTN network layer recovers the fault with the OTN standby path.

In the fifth situation shown in FIG. 11, in the node C 70 (FIG. 9) the MPLS-TP CC information is not received by either of the OTN network path interface 72 and the OTN network standby path interface 74. The MPLS-TP CC monitoring function 90 therefore determines that the MPLS-TP client is not operational, and passes this non-operational status information to the MPLS-TP packet determination function 92. The MPLS-TP packet determination function 92 determines that an MPLS-TP network layer switch is required irrespective of whether the OTN OAM monitoring function 88 receives OTN OAM messages from the OTN network working path interface 72 and OTN network standby path 74. This situation corresponds to the situation shown in FIG. 3.

Since no MPLS-TP CC information is being received, and the MPLS-TP packet determination function 92 has determined that an MPLS-TP layer switch is required, no MPLS- TP CC packets are created by the MPLS-TP CC packet determination function or sent to MPLS-TP network interface 76 for onward transmission within the MPLS-TP network layer.

In node D 110 (FIG. 10), the MPLS-TP CC monitoring function 128 determines that a continuity protection message has not been received, in step 67, and therefore in step 68 initiates a switch to the MPLS-TP network standby path by sending a control signal to the MPLS-TP protection module 130.

In this situation, since the fault lies within the MPLS-TP network layer, the MPLS-TP network layer must switch to the standby path. However, the switching to the MPLS-TP standby path is accomplished with the minimum of delay since a hold-off timer is not used.

As will be apparent to a skilled person, embodiments of the present invention provide an effective means to co-ordinate the protection switching of two or more network layers without delaying the intervention time of any layer. In particular, embodiments of the present invention allows the switching time of nested connection oriented end-to end network layer protection instances to be optimised without fault protection action by the most appropriate network layer being delayed, for example by hold-off timers or by a lower OAM repetition rate.

Both an intrusive method and a non-intrusive method are disclosed. In both methods, an intermediate node within a network layer protection instance (MPLS-TP network layer) is required to monitor the OAM messages being sent between the end nodes (nodes A and D in the exemplary arrangement) instead of passing the OAM messages transparently as is conventional. Thus because the intermediate node (node C in the exemplary embodiment) monitors both network layers, the intermediate node has sufficient information to understand completely the operational situation, and what actions are required for fault recovery.

In the non-intrusive method an intermediate node cannot modify the OAM messages sent between the end nodes (nodes A and D in the exemplary arrangement), but can insert an OAM message to instruct the receiving end node (node D in the exemplary arrangement) not to switch to the standby path, thus emulating continuity in the network layer. This method requires modification to the operation of both the intermediate node (node C in the illustrative embodiment) to insert the new OAM message and the end node (node D in the illustrative embodiment) to respond correctly to receipt of the new message.

In the intrusive mode, an intermediate node (node C in the exemplary arrangement) is able to modify the OAM messages sent between the end nodes (nodes A and D in the exemplary arrangement) by suppressing and/or generating the OAM messages. Again the intermediate node can emulate continuity in the network layer to prevent the end node (node D in the exemplary arrangement) initiating a switch to the standby path. This method requires a modification only to the operation of the intermediate node, since the end node (node D in the exemplary arrangement) operates in the conventional way in this arrangement.

The invention has been described with reference to data traffic from node A to node D in the exemplary embodiment. However, as will be apparent to a skilled person, the node B will operate in the manner described above for node C for data traffic in the D to A direction.

Moreover, the principles described above with reference to the exemplary embodiment can be applied to the standby path of the network layer, for example the MPLS-TP standby path in the exemplary embodiment, where another connection-oriented network layer is established in connection with the standby path in addition to the MPLS-TP network layer. This situation would arise, for example in the above described embodiment, when the MPLS-TP standby path is carried in part by the OTN network 22 or another OTN network.

In addition, as will be apparent to a skilled person, embodiments of the invention may also be employed with the use of Automatic Protection Switching/Protection Switching Coordination (APS/PSC) messages by node A and node D. In addition, the intermediate node C may monitor the status of network layers using any appropriate fault monitoring and detection mechanism available in the network layer.

Embodiments of the invention are also applicable to the co-existence of protection mechanisms within the same technology, for instance Label switched path (LSP) and Pseudo wire (PW) protections, LSP nesting within MPLS-TP or between other types of technology. In addition the invention may also be applied to the Provider Backbone Bridge Traffic Engineering (PBB-TE) since OAM CC packets are used also in this technology for protection switching purposes.

Modifications and other embodiments of the disclosed invention will come to mind to one skilled in the art having the benefit of the teachings presented in the foregoing description and the associated drawings. Therefore it is to be understood that the invention is not to be limited to specific embodiments disclosed and that modifications and other embodiments are intended to be included within the scope of this disclosure. Although specific terms may be employed herein, they are used in a generic and descriptive sense only and not for the purposes of limitation.

The invention claimed is:

1. A method of fault monitoring comprising the steps of:
monitoring, in a network node of a network having at least a first connection-oriented network layer having first protection measures associated therewith and a second connection-oriented network layer having second protection measures associated therewith, a service condition status of the first network layer using first protection measures based on a first communications protocol;
wherein the first network layer comprises a first plurality of network nodes and the second layer comprises a second plurality of network nodes that are a subset of the first plurality of network nodes;
determining second network layer protection measures based on a second communications protocol for onward transmission within the second network layer depending on the service condition status of the first network layer; and
monitoring a service status of a working path of the second network layer using received second network layer protection measures.

2. The method as claimed in claim 1, wherein the second network layer protection measures for onward transmission within the second network layer are determined depending on the service status of the working path of the second network layer.

3. The method as claimed in claim 1 wherein, in the step of determining second network layer protection measures, a switch-inhibiting second network layer protection message, which inhibits switching of the working path of the second network layer, is determined for onward transmission within the second network layer if the step of monitoring the service condition status of the first network layer indicates that the first network layer has a fault recoverable by the first network layer.

4. The method as claimed in claim 3 wherein the switch-inhibiting second network layer protection message determined for onward transmission is substantially identical or at least substantially corresponds to a second network layer protection message received at the network node.

5. The method as claimed in claim 3 wherein the switch-inhibiting second network layer protection message determined for onward transmission is a DoNotSwitch type second network layer protection message.

6. The method as claimed in claim 5 in which the DoNotSwitch type second network layer protection message is a Type-Length-Value network layer protection message having a type field value identifying the DoNotSwitch-type network layer protection message type.

7. The method as claimed in claim 1 further comprising the step of creating the determined second network layer protection message for onward transmission within the second network layer.

8. The method as claimed in claim 1 wherein the step of monitoring the service condition status of the first network layer comprises the step of monitoring the status of at least the current working path and the current stand-by path of the first network layer using first protection measures.

9. The method as claimed in claim 2, wherein the step of monitoring the service condition status of the second network layer comprises the step of monitoring protection messages of the second network layer received via the first network layer working path or the first network layer stand-by path.

10. A machine-readable medium comprising instructions which, when executed by a processor, cause the processor to perform a method of fault monitoring comprising:
    monitoring, in a network node of a network having at least a first connection-oriented network layer having first protection measures associated therewith and a second connection-oriented network layer having second protection measures associated therewith, a service condition status of the first network layer using first protection measures based on a first communications protocol;
    wherein the first network layer comprises a first plurality of network nodes and the second layer comprises a second plurality of network nodes that are a subset of the first plurality of network nodes;
    determining second network layer protection measures based on a second communications protocol for onward transmission within the second network layer depending on the service condition status of the first network layer; and
    monitoring a service condition status of a working path of the second network layer using received second network layer protection measures.

11. A node comprising one or more processors operable to:
    receive, at the node in a network having at least first and second connection-oriented layers having first and second protection measures respectively associated therewith, first protection measures based on a first communications protocol and to monitor a service condition status of the first network layer using first protection measures;
    wherein the first network layer comprises a first plurality of network nodes and the second layer comprises a second plurality of network nodes that are a subset of the first plurality of network nodes; and
    receive status information from the first module, to determine second network layer protection measures based on a second communications protocol for onward transmission within the second network layer, depending on the service condition status of the first network layer, and to monitor a service condition status of a working path of the second network layer using received second network layer protection measures.

\* \* \* \* \*